(12) United States Patent
Keegan

(10) Patent No.: US 6,423,896 B1
(45) Date of Patent: Jul. 23, 2002

(54) THERMOPHOTOVOLTAIC INSULATION FOR A SOLID OXIDE FUEL CELL SYSTEM

(75) Inventor: Kevin Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/796,121

(22) Filed: Feb. 28, 2001

(51) Int. Cl.$^7$ .................. H01L 31/058; H01M 8/18; H01M 8/10

(52) U.S. Cl. .............. 136/253; 136/291; 136/205; 136/206; 429/12; 429/13; 429/26; 429/30; 429/111

(58) Field of Search ................ 136/253, 291, 136/205, 206; 429/12, 13, 26, 30, 111

(56) References Cited

U.S. PATENT DOCUMENTS

| | | | |
|---|---|---|---|
| 5,356,487 A | * 10/1994 | Goldstein et al. | 136/253 |
| 5,753,383 A | * 5/1998 | Cargnelli et al. | 429/13 |
| 5,897,715 A | 4/1999 | Ward et al. | 136/244 |
| 5,969,435 A | * 10/1999 | Wilhelm | 307/64 |
| 6,096,966 A | * 8/2000 | Nishimoto et al. | 136/205 |
| 6,150,604 A | 11/2000 | Freundlich et al. | 136/253 |

FOREIGN PATENT DOCUMENTS

| | | |
|---|---|---|
| DE | 19825872 C1 | * 10/1999 |
| JP | 4-280484 A | * 10/1992 |
| JP | 8-205567 A | * 8/1996 |
| JP | 2000-173640 A | * 6/2000 |

OTHER PUBLICATIONS

"High Efficiency Thermophotovoltaics for Automotive Applications", SAE Technical Paper Series, pp. 1–6 (Mar., 2000).

* cited by examiner

Primary Examiner—Alan Diamond
(74) Attorney, Agent, or Firm—Vincent A. Cichosz

(57) ABSTRACT

A fuel cell system is disclosed. The fuel cell system comprises a thermophotovoltaic insulation disposed around at least a portion of a fuel cell. Methods for operating the fuel cell system are also disclosed.

17 Claims, 2 Drawing Sheets

THERMOPHOTOVOLTAIC INSULATION FOR A SOLID OXIDE FUEL CELL SYSTEM

BACKGROUND

A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposites of an electrolyte. The oxidant passes over the oxygen electrode (cathode) while the fuel passes over the fuel electrode (anode), generating electricity, water, and heat. There are several types of fuel cells, including proton exchange membrane (PEM) fuel cells and solid oxide fuel cells (SOFC).

A SOFC is constructed entirely of solid-state materials, utilizing an ion conductive oxide ceramic as the electrolyte. A SOFC operates at high temperatures (e.g., temperatures of about −40° C. up to about 1,200° C.). A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electrical power. However, each individual electrochemical cell generates a relatively small voltage. Higher voltages are attained by electrically connecting a plurality of electrochemical cells in series to form a stack.

The fuel cell stack also includes conduits or manifolds to allow passage of the fuel and oxidant into and byproducts, as well as excess fuel and oxidant, out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes typically create oxidant and fuel flows across the electrodes that are perpendicular to one another.

The long term successful operation of a fuel cell depends primarily on maintaining structural and chemical stability of fuel cell components during steady state conditions, as well as transient operating conditions such as cold startups and emergency shut downs. The support systems are required to store and control the fuel, compress and control the oxidant and provide thermal energy management.

Generally, SOFC stacks are wrapped with an insulation to insulate the stack and retain the heat. Currently, the auxiliary power unit system expends fuel to provide thermal energy to the fuel cell stack. However, to maintain the thermal energy within the fuel cell stack, more and thicker insulation is required.

SUMMARY

The drawbacks and disadvantages of the prior art are overcome by the thermophotovoltaic insulation for a SOFC system.

A fuel cell system is disclosed, which comprises a thermophotovoltaic insulation disposed in thermal communication with at least a portion of a fuel cell.

A method of operating a fuel cell system is also disclosed. The method comprises disposing a thermophotovoltaic insulation in thermal communication with a fuel cell. The fuel cell system is then operated to produce thermal energy. The thermal energy is then harnessed by the thermophotovoltaic insulation and transformed into electricity.

A fuel cell system is disclosed. The fuel cell system comprises a fuel cell stack comprising a plurality of fuel cells. A fuel supply and an oxidant supply are disposed in fluid communication with the fuel cell stack. A thermophotovoltaic insulation is disposed around at least a portion of the fuel cell stack. The thermophotovoltaic insulation comprises a selective emitter and a photovoltaic converter.

A fuel cell system is disclosed. The fuel cell system comprises a fuel cell and a means for producing electricity from thermal energy harnessed from the fuel cell.

The above described and other features are exemplified by the following figures and detailed description.

BRIEF DESCRIPTION OF THE DRAWINGS

Referring now to the figures, which are meant to be exemplary not limiting, and wherein like elements are numbered alike in the several figures.

DETAILED DESCRIPTION

Figure 1:
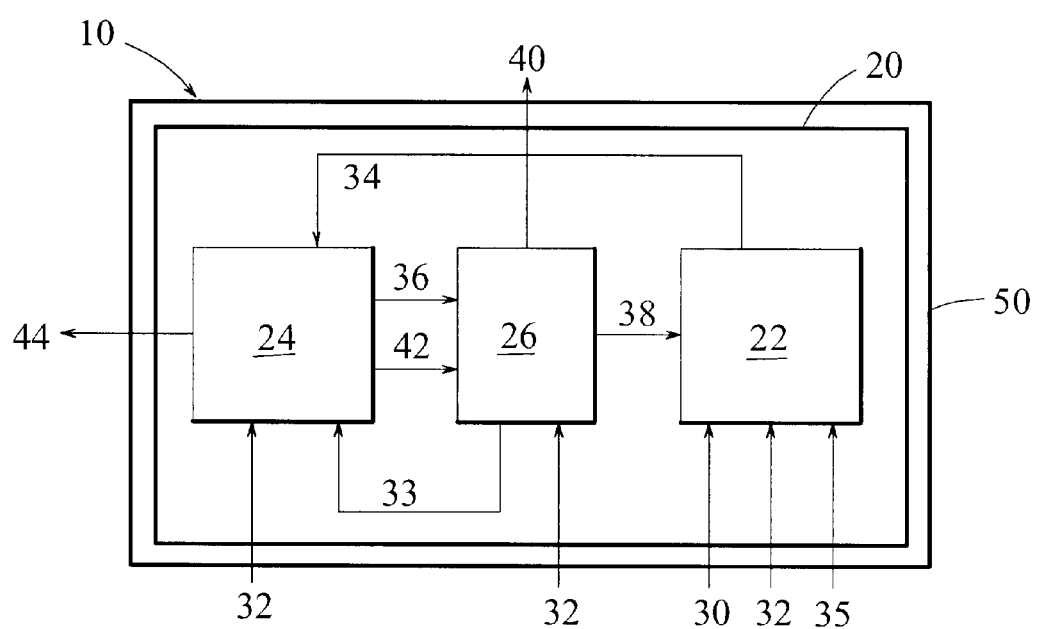
FIG. 1 is a schematic of an exemplary thermophotovoltaic insulation surrounding a fuel cell system.

Referring now to FIG. 1, an auxiliary power unit (or fuel cell) system 10 is schematically depicted. The fuel cell system 10 comprises a fuel cell (or fuel cell stack) 24 contained within an enclosure 20 for thermal management (also referred to as a "hot box"). The fuel cell stack 24, which may also comprise a plurality of modular fuel cell stacks, is generally connected to a fuel (or reformate) inlet 34, an exterior air (or oxidant) supply inlet 32, and a heated air (or oxidant) supply inlet 33.

To facilitate the reaction in the fuel cell, a direct supply of the fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel.

Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, and combinations comprising at least one of the foregoing methods, and the like; and combinations comprising at least one of the foregoing fuels. The preferred fuel is typically based upon the power density of the engine, with lighter fuels, i.e., those which can be more readily vaporized and/or conventional fuels which are readily available to consumers, generally preferred.

Located within the fuel cell system enclosure 20, is the reformer system 22 that comprises a main reformer, and optionally, a micro-reformer. The reformer 22 is provided with a fuel through a fuel inlet 30, an exterior air (or oxidant) inlet 32, and a water supply inlet 35. The reformer system 22 is thermally isolated from the fuel cell stack 24, (i.e., a segmented enclosure, isolated enclosure, or the like). The processing or reforming of hydrocarbon fuels, such as gasoline, is completed to provide an immediate fuel source for rapid start up of the fuel cell as well as protecting the fuel cell by removing impurities. Fuel reforming can be used to convert a hydrocarbon (such as gasoline) or an oxygenated fuel (such as methanol) into hydrogen ($H_2$) and byproducts (e.g., carbon monoxide (CO), carbon dioxide ($CO_2$), and water). Common approaches include steam reforming, partial oxidation, dry reforming, and the like, as well as combinations comprising at least one of the foregoing approaches.

The reformer system 22, preferably utilizing a steam reformer, creates a reformate 34 for use by the fuel cell stack 24. The fuel cell stack 24 uses this reformate 34 to create electrical energy 44 for harnessing and waste byproducts, thermal energy, spent/unreacted fuel 36, and spent air 42. Thermal energy from the flow of spent/unreacted fuel 36 can optionally be recovered in a waste energy recovery system 26, which can recycle the flow of fuel 38 and waste heat combined with oxidant from an exterior air (or oxidant) inlet 32, to the fuel reformer 22 and can also discharge a flow of reaction products (e.g., water and carbon dioxide) 40 from the system. Alternatively, some or all of the spent/unreacted fuel 36 may be introduced to an engine (not shown) or a turbine (not shown) for energy recovery. Additionally, unreacted oxygen and other air constituents 42 are discharged from the fuel cell stack 24. Ultimately, electrical energy 44 is harnessed from the fuel cell for use by the motor vehicle (not shown) or other appropriate energy sink.

Figure 2:
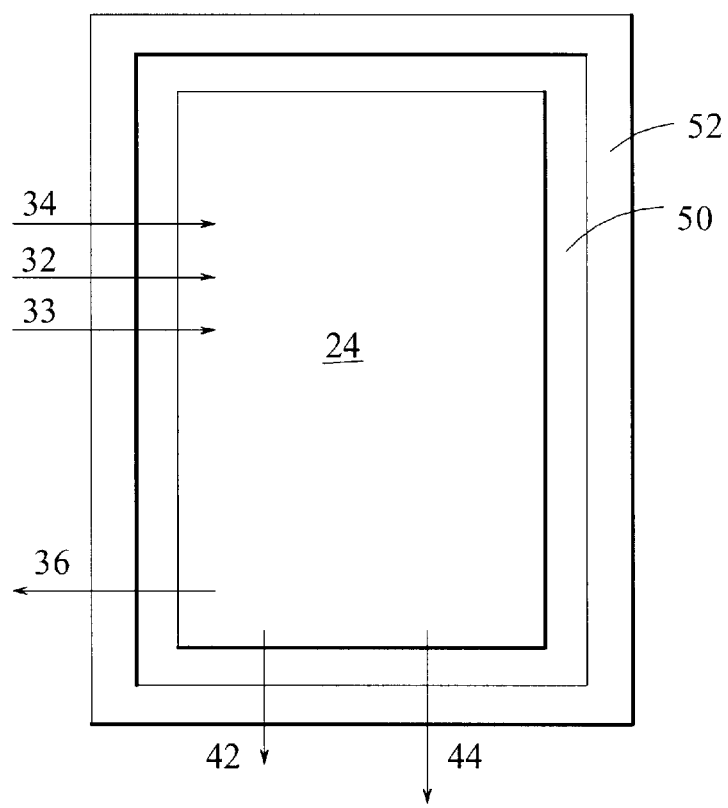
FIG. 2 is a schematic of a thermophotovoltaic insulation surrounding a SOFC stack.

Surrounding the enclosure 20 of the fuel cell system 10 can be a thermophotovoltaic insulation 50. The thermophotovoltaic insulation 50 can be disposed in thermal communication with the fuel cell, preferably along at least one side, more preferably around all sides or at least a portion of the fuel cell system (or fuel cell stack). An optional layer of non-thermophotovoltaic insulation (not shown) can also be disposed around the thermophotovoltaic insulation 50. The thermophotovoltaic insulation 50 can be thermally insulated, prohibiting the transfer of thermal energy by convection, conduction, or radiation away from the fuel cell system 10. In the alternative, as illustrated in FIG. 2, the fuel cell stack 24 can be surrounded (or encased) with a thermophotovoltaic insulation 50, and optionally, an additional layer of insulation 52.

Figure 3:
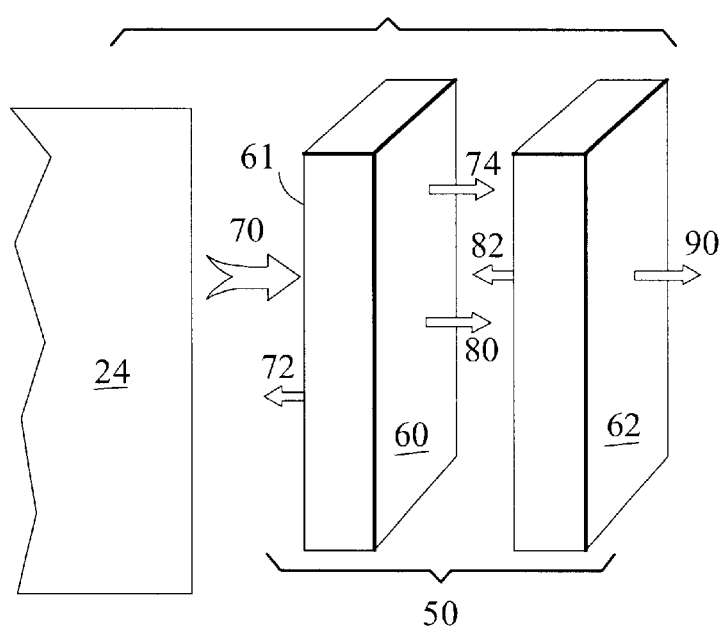
FIG. 3 is a schematic of the flow of thermal energy flow through the thermophotovoltaic insulation.

As illustrated in FIG. 3, a SOFC stack 24 can be connected with a selective emitter 60 that emits photons (light) in a limited spectral band (or infrared radiation) 80 when heated (e.g., when heated by the waste heat emitted from the SOFC stack 24). The supply of thermal energy 70 to the selective emitter 60 results in recycled radiation 72 back to the SOFC stack 24 and thermal convection 74 disseminating from the surface of the selective emitter 60. Although a portion of the flow of infrared radiation 80 from the selective emitter 60 may be reflected 82, the majority of the infrared radiation 80 flows through the photovoltaic converter 62 creating a photocurrent (or electricity) 90.

The thermophotovoltaic insulation 50 converts heat radiation, from a heat source, into electricity by photovoltaic generation. The electricity generated by the thermophotovoltaic insulation 50 can be used to provide a source of power for the fuel cell system or elsewhere. The thermophotovoltaic insulation 50 is created on electrically insulating substrate (not shown) and comprises a selective emitter 60 and a series of photovoltaic cells (or converters) 62. An infrared reflector or recuperator (not shown) can optionally be added to the fuel cell system to recuperate waste photons.

A heat source, such as a SOFC stack 24 or the fuel cell system 10, can provide thermal energy, in the form of waste heat, for recovery by the thermophotovoltaic insulation for processing into electricity. The fuel cell system 20 can provide a supply of thermal energy 70 of up to about 1,200° C. to the thermophotovoltaic insulation 50.

In thermal communication with the heat source is the selective emitter 60. The selective emitter 60 can comprise a photovoltaic material that produces excited photons, such as yttrium, aluminum, garnet, silicon, carbon, and the like, as well as combinations comprising at least one of the foregoing materials. On the heat source side 61, the selective emitter 60 can have a thin metal substrate comprising, or coated with, materials whose radiation emissivity is preferably maximum in a narrow spectral range. The selection of the material is dependent upon the operating temperature of the selective emitter 60 and can be determined by one of ordinary skill in the art. These materials include rare earth elements such as erbium, thulium, holmium, as well as gallium, antimony, indium, arsenic, aluminum, cobalt, platinum, radium, and the like, as well as alloys, oxides, and combinations comprising at least one of the foregoing materials. These materials preferably reflect the broadband radiation produced by the heat source.

The selective emitter 60 should be created from materials with a band gap that corresponds to the wavelength of the flow of thermal energy 70. Typically, electrons in the valence band of an atom cannot escape the atom. However, if an infrared photon containing the right amount of energy impacts an atom, an electron can be lifted to the conduction band and flow. The amount of energy needed to free an electron depends upon the electrical property known as the band gap. A low band gap maximizes light absorption, and hence the output current, while a high band gap maximizes output voltage. Therefore, a low band gap, i.e., about 0.55 electron-volt (eV) to about 1.1 eV photovoltaic converter can achieve higher efficiencies. The selective emitter 60 transforms heat adsorbed thereby into infrared radiation 80 that can be efficiently converted by the photovoltaic converters 62. A negligible amount of infrared radiation below the effective band gap of the photovoltaic converters 62 can be created and disseminated from the system.

The photovoltaic converters 62 preferably comprise a material designed to coincide with the emission spectrum of the selective emitter 60. These materials can be selected from materials found in Group III through Group IV on the periodic table, preferably including indium, gallium, arsenic, antimony, phosphorous, and the like, as well as alloys, oxides, and combinations comprising at least one of the foregoing materials.

Due to the proximity of the heat source (e.g., the SOFC stack 24) to the photovoltaic converter 62, the efficiency of the insulation can be greater than 80% because of the bi-directional exchange of the radiation between the heat source (e.g., the SOFC stack 24) and the thermophotovoltaic insulation 50. Thus, the recycled flow of radiation 72 can be reused by the SOFC stack 24, which in turn produces more thermal energy for use by the thermophotovoltaic insulation 50.

During operation of the fuel cell system, a hydrocarbon fuel is directed to a reformer where the fuel is processed into a reformate for use by the fuel cell stack. The fuel cell stack uses the reformate to create electrical energy for harnessing, as well as producing thermal energy as a byproduct. The thermal energy can be used by the thermophotovoltaic insulation to create electrical energy. The thermal energy is captured by the selective emitter which, in turn, produces radiation that is converted by the photovoltaic converters into electricity.

The use of thermophotovoltaic insulation provides for greater fuel cell system efficiency, about 80% efficient conversion of beat to electricity, such that the requirements for thicker insulation car be reduced. Likewise, the need to consume fuel to maintain the fuel cell system at or near operating conditions is reduced, or eliminated, by the energy recovered and the heat retained by the thermophotovoltaic insulation. For example, a SOFC stack solely wrapped with non-thermophotovoltaic insulation loses about 0.5 kilowatts, therefore, if 80% of the heat is recovered with thermophotovoltaic insulation and turned into electricity, about 0.4 kilowatts of electricity is added to the output of the entire system. Therefore, if a system that delivers only about 2 kilowatts of electricity was only 20% efficient before the use of thermophotovoltaic insulation, it would be 24% efficient with the use of the thermophotovoltaic insulation, thereby delivering 2.4 kilowatts of electricity. This is a substantial improvement in system efficiency. Additionally, the excess thermal energy from the SOFC stack can be transformed by the thermophotovoltaic insulation into electricity for use by the fuel cell system.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A fuel cell system, comprising:
   a thermophotovoltaic insulation disposed in thermal communication with at least a portion of a fuel cell.

2. The fuel cell system of claim 1, wherein said thermophotovoltaic insulation further comprises a selective emitter and a photovoltaic converter.

3. The fuel cell system of claim 1, further comprising a non-thermophotovoltaic insulation disposed around at least a portion of said thermophotovoltaic insulation.

4. The fuel cell system of claim 1, further comprising a reformer and a waste energy recovery system in fluid communication with said fuel cell.

5. The fuel cell system of claim 1, wherein said fuel cell is a solid oxide fuel cell.

6. The fuel cell system of claim 1, wherein said thermophotovoltaic insulation is disposed in physical contact with said fuel cell.

7. The fuel cell system of claim 1, wherein said thermophotovoltaic insulation is disposed around at least a portion of said fuel cell.

8. A method of operating a fuel cell system, comprising:
   operating a fuel cell to produce thermal energy;
   harnessing said thermal energy with thermophotovoltaic insulation; and
   transforming said thermal energy into electricity.

9. The method of claim 8, wherein said harnessing said thermal energy further comprises producing infrared radiation with a selective emitter.

10. The method of claim 9, further comprising converting said infrared radiation to electricity with a photovoltaic converter.

11. A fuel cell system, comprising:
    a fuel cell stack comprising a plurality of fuel cells;
    a fuel supply in fluid communication with said fuel cell stack;
    an oxidant supply in fluid communication with said fuel cell stack; and
    a thermophotovoltaic insulation disposed in thermal communication with at least a portion of said fuel cell stack, said thermophotovoltaic insulation comprising a selective emitter and a photovoltaic converter.

12. The fuel cell system of claim 11, further comprising a reformer in fluid communication with said fuel supply and said fuel cell stack.

13. The fuel cell system of claim 11, further comprising a waste energy recovery system.

14. A fuel cell system, comprising:
    a fuel cell; and
    a means for producing electricity by photovoltaic generation from thermal energy harnessed from said fuel cell, wherein said means for producing electricity is disposed around at least a portion of said fuel cell.

15. A fuel cell system, comprising:
    a fuel cell; and
    a means for producing electricity from thermal energy harnessed from said fuel cell, comprising thermophotovoltaic insulation.

16. A fuel cell system, comprising:
    a fuel cell; and
    a means for producing electricity from thermal energy harnessed from said fuel cell, comprising a selective emitter and a photovoltaic converter.

17. A fuel cell system, comprising:
    a fuel cell; and
    a means for producing electricity from thermal energy harnessed from said fuel cell, comprising a means for producing infrared radiation and a means for converting said infrared radiation to electricity.

* * * * *